Jan. 29, 1929.  
A. M. GOODLOE  
1,700,126  
FILTER MEDIUM FOR AIR AND GASES  
Filed June 17, 1926
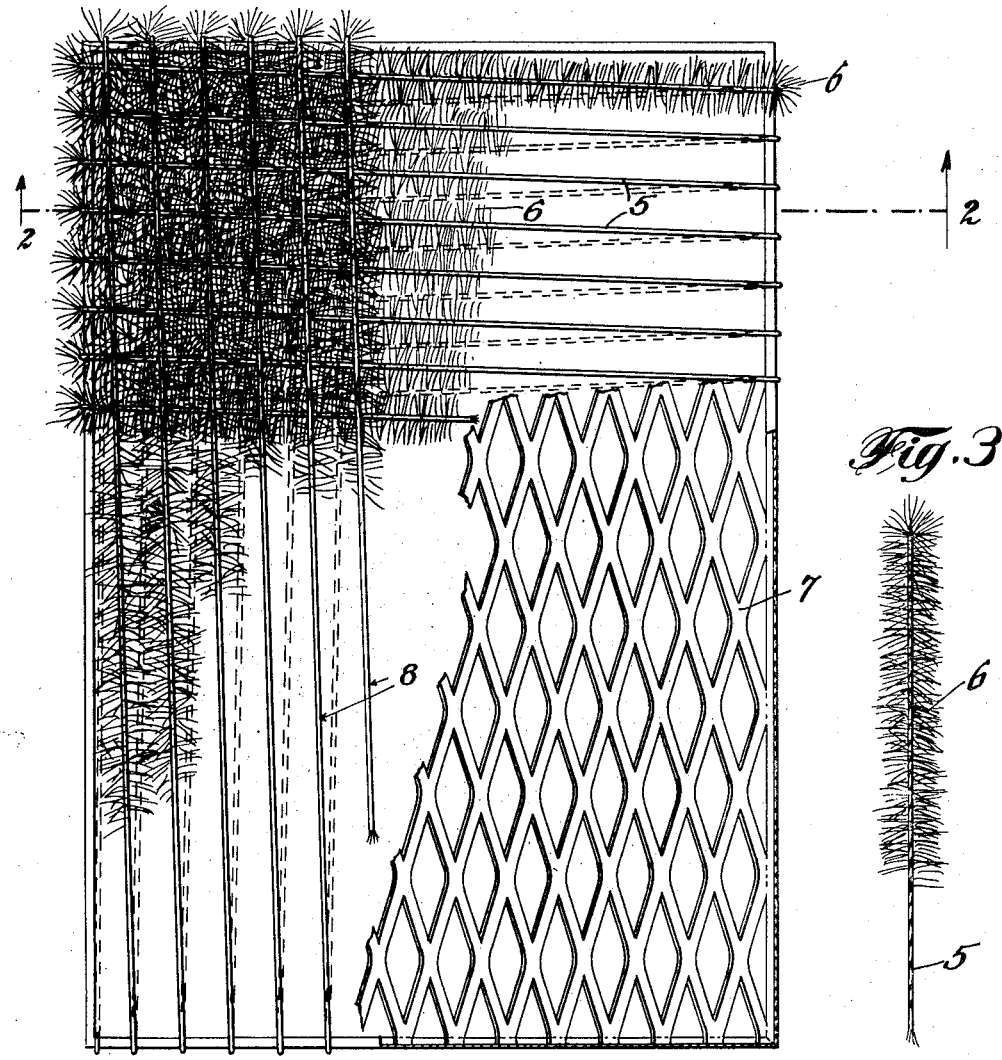
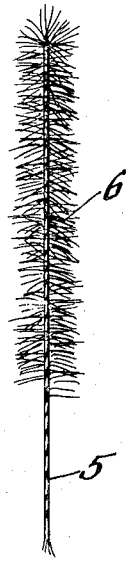
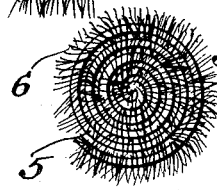
INVENTOR  
Alfred M. Goodloe  
BY  
ATTORNEY Patented Jan. 29, 1929.

1,700,126

UNITED STATES PATENT OFFICE.

ALFRED M. GOODLOE, OF BRADFORD, PENNSYLVANIA, ASSIGNOR TO AMERICAN KREUGER & TOLL CORPORATION, OF NEW YORK, N. Y., A CORPORATION OF NEW YORK.

FILTER MEDIUM FOR AIR AND GASES.

Application filed June 17, 1926. Serial No. 116,595.

This invention relates to a filter medium for air and gases, and has for its primary object to provide a filter medium for this purpose which will be highly effective for the purpose of removing dust and other foreign matters carried in suspension by the air or gas, and is of such construction that the accumulated dust can be easily washed out or removed therefrom.

Generically considered, my present invention comprehends the provision of such a filtering medium embodying as its essential structural elements, a suitable base and closely arranged spines fixed to and projecting in promiscuously intersecting relation from said base. Preferably the spines are flexible and may consist of thin strips of metal band or wire, asbestos or textile fibers or other material presenting a relatively large surface area and which would project in substantially straight lines from the base to which they are fixed.

In practice, the surfaces of the flexible spines above referred to are covered or coated with a more or less adhesive liquid, such as viscosine, and it is one of the important objects of the invention to provide a base or core for these spines constituting a holder or reservoir for the viscosine and from which it is automatically drawn by capillary attraction as the dust accumulates upon the spines, whereby the viscous coating upon the latter will be renewed and maintained at its highest efficiency.

It is a further object of my invention to provide such a filter medium in the form of a brush-like strand having a flexible core to which the spines are fixed and which may therefore, be most advantageously used in connection with that type of air and gas filter apparatus in which the filtering medium is of progressively increasing density from the point of ingress to the point of egress of the air. Thus, due to the continuous strand-like form of the filtering material, it may in one case be readily wound upon a frame of expanded metal or other foraminous construction in a plurality of superimposed layers, and in other cases, said material may be interwoven to provide a sheet or mat of any desired thickness, or the strand may be merely more or less closely coiled in the form of a continuous spiral. Of course, many other adaptations of this new filtering medium will readily suggest themselves to those skilled in the art.

Other objects of my invention which are more or less apparent from the foregoing are to provide a filtering material which offers negligible resistance to the flow of air or gas, and from which the excess viscosine or other adhesive liquid will easily and quickly drain, and finally to provide a filtering medium for this purpose which can be produced at very low manufacturing cost.

With the above and other objects in view, the invention consists in the improved filter medium for air and gases and in the several novel structural features thereof, as will be hereinafter more fully described, illustrated in the accompanying drawing, and subsequently incorporated in the subjoined claims.

In the drawing, wherein I have disclosed one simple and practical embodiment of the invention, and in which similar reference characters designate corresponding parts throughout the several views,—

Figure 1 is an elevation illustrating my new filtering medium and showing one practical application thereof for use in air and gas filtering apparatus;

Fig. 2 is a sectional view taken on the line 2—2 of Fig. 1;

Fig. 3 is a detail view of a section of the brush-like strand of filtering material;

Fig. 4 is a detail horizontal section showing the filtering strands woven into the form of a sheet or mat, and Fig. 5 is a plan view showing the strand coiled into spiral form.

Referring in detail to the drawing, in the embodiment of the invention which I have selected for purposes of illustration, my new filtering medium consists essentially of a base or core 5. This core may consist of a thin metal strand of either flat or cylindrical form, but for reasons which will hereinafter be explained, I preferably employ a core of textile material, such as a cord consisting of two or more intertwisted threads.

To the core 5 there is fixed, in any suitable manner and at substantially equi-distantly spaced points throughout the length thereof, closely arranged spines 6 which project substantially in radial directions from the core and in promiscuously intersecting relation to each other. These spines likewise are preferably of flexible material and for this purpose, I prefer to use very thin flat strips of metal having a relatively large surface area. These metal strips may be of any desired predetermined length, and in case a textile cord is used for the core 5, said spines may be conveniently affixed to said core by engaging the central part of the metal spines between the intertwisted threads of said core. However, it may be found desirable in many instances especially in gas filtering apparatus to provide the flexible spines 6 of asbestos or textile fibers, and it will therefore, be understood that no limitations are to be implied, in so far as the specific character of the materials constituting the core 5 and the spines 6 is concerned.

It will thus be seen that the new filtering medium is essentially in the form of a continuous flexible brush-like strand which may be readily wound upon itself into various forms, or wound or wrapped around and upon a more or less rigid foraminous core. The latter use of this material is illustrated in Fig. 1 of the drawings wherein I have shown a frame consisting of a sheet of expanded metal 7. The brush-like strand of filtering material is wound upon this frame, first in one direction and then in an opposite intersecting direction with respect to the first winding. The convolutions 8 of the strand may be spaced apart for any desired distance, and any preferred number of these strand windings alternately intersecting each other may be superimposed upon the frame or core 7 so that the flexible spines 6 on the adjacent convolutions 8 of each winding may intersect each other as well as the spines 6 of the superimposed strand convolutions. There may thus be provided upon the frame 7 a mat or net work of the intersecting flexible spines 6 of any desired thickness.

After the frame has thus been provided with the new filtering material, the whole is then immersed into a suitable adhesive solution such as viscosine. The excess liquid will readily drain off from the spines 6, while the core 5 will become impregnated with the liquid substantially to its saturation point. Thus, it will be understood that this core constitutes a holder or reservoir for the adhesive liquid. In operation, in view of the large area of the coated surfaces of the spines 6, dust particles contained in the air or gas will be substantially completely removed therefrom and retained by said adhesive coated spines. At the same time, in view of the fact that these spines are of flexible material, they will offer a negligible resistance to the flow of the air or gas. Further, it will be apparent that as the dust accumulates upon the spines 6, the adhesive liquid is exuded or withdrawn from the core 5 by capillary attraction and flows therefrom upon the surfaces of the spines 6, thereby renewing the adhesive coating and maintaining the material at its highest operating efficiency. However, when it becomes necessary, the accumulated dust may be easily and quickly removed or washed from the filtering material owing to the fact that the spines 6 extend substantially in straight lines from the strand core 5.

In Fig. 4 of the drawings, I have shown the brush-like strands of filtering material interwoven into the form of a mat or sheet. In filter apparatus wherein filtering material of gradually increasing density between the ingress and egress points of the air or gas is employed, my new filtering medium in this form may be very advantageously employed, as any number of these sheets may be arranged in spaced series alternating with a reticulated or foraminous metallic material.

In Fig. 5, I have shown the brush-like strand of filtering material arranged in the form of a spiral coil. The coil convolutions may be spaced apart to any extent desired, and any desired number of the strands in this spirally coiled form may be superimposed upon each other. Therefore, my new filtering material readily lends itself to use in connection with the cylindrical drum type of filtering apparatus.

From the foregoing description, the construction, manner of use and several advantages of my new filtering medium will be clearly and fully understood. Such material may obviously be produced at very low manufacturing cost, and in view of the multitude of adaptations thereof which are possible for use in connection with the numerous different types of filtering apparatus, it will be manifest that the sphere of utility of such material is practically co-extensive with the art in its present stage of development. It will of course, be apparent that the brush-like strands may be either coarse or fine as the exigencies of the particular filter installation may require. Therefore, in so far as the essential characteristics of my present improvements are concerned, the invention is not to be considered as in any manner restricted or limited to the specific embodiment thereof which I have selected for purposes of illustration, since such essential features might be exemplified in various other alternative structural forms. Accordingly, I reserve the privilege of adopting all such legitimate changes in the form, construction and relative arrangement of the several elements as may be fairly incorporated within the spirit and scope of the appended claims.

I claim:

1. In a filter for air and gas, a filter medium consisting of brush-like strands including closely arranged intersecting spines presenting impingement surfaces to the air flow, said strands being arranged in adjacent relation, with the spines of one commingling with those of adjacent strands, and means for supplying a dust retaining liquid to the surface of said spines, said surfaces being non-absorbent and self draining whereby depending spines of one strand drain said liquid upon spines of the adjacent strands.

2. In a filter for air and gas, a filter medium consisting of brush-like strands including a liquid absorbing and exuding base and closely arranged intersecting spines presenting impingement surfaces to the air flow, said spines being arranged in adjacent relation with the spines of one commingling with those of adjacent strands, the surfaces of said spines being non-absorbent and self draining whereby depending spines of one strand drain the liquid upon spines of the adjacent strands and non-depending spines drain to the base of the strands.

In testimony that I claim the foregoing as my invention, I have signed my name hereto.

ALFRED M. GOODLOE.